US012746843B2

(12) United States Patent
Hashimoto et al.

(10) Patent No.: US 12,746,843 B2
(45) Date of Patent: Sep. 29, 2026

(54) CONTROL DEVICE FOR POWER SUPPLY DURING TRAVELING

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Shogo Tsuge, Fuji (JP); Ryosuke Ikemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 18/408,954

(22) Filed: Jan. 10, 2024

(65) Prior Publication Data

US 2024/0253511 A1 Aug. 1, 2024

(30) Foreign Application Priority Data

Feb. 1, 2023 (JP) ................................. 2023-013742

(51) Int. Cl.
*B60L 53/66* (2019.01)

(52) U.S. Cl.
CPC ........... *B60L 53/66* (2019.02); *B60L 2240/12* (2013.01)

(58) Field of Classification Search
USPC .......................................................... 700/295
See application file for complete search history.

(56) References Cited

U.S. PATENT DOCUMENTS

| | | | | |
|---|---|---|---|---|
| 10,589,672 | B1 * | 3/2020 | Chakrapani | E05B 81/77 |
| 2001/0003958 | A1 * | 6/2001 | Murata | B61L 23/041<br>104/299 |
| 2016/0068075 | A1 * | 3/2016 | Chen | B60L 53/18<br>320/107 |
| 2018/0009446 | A1 * | 1/2018 | Ricci | A61B 5/1171 |
| 2018/0189683 | A1 * | 7/2018 | Newman | B60L 58/12 |
| 2019/0111916 | A1 * | 4/2019 | Lee | G08G 1/143 |
| 2019/0225097 | A1 | 7/2019 | Hase | |
| 2022/0402388 | A1 | 12/2022 | Ikemura et al. | |
| 2025/0260076 | A1 * | 8/2025 | Colak | H01M 10/482 |

FOREIGN PATENT DOCUMENTS

| | | | | |
|---|---|---|---|---|
| CN | 106802710 | A | * | 6/2017 |
| JP | 6314746 | B2 | * | 4/2018 |
| JP | 2019-129541 | A | | 8/2019 |
| JP | 2023-001045 | A | | 1/2023 |
| KR | 20210129769 | A | * | 10/2021 |
| TW | I555297 | B | * | 10/2016 |
| WO | WO 2022255339 | A1 | * | 12/2022 |
| WO | WO 2024134760 | A1 | * | 6/2024 |

* cited by examiner

*Primary Examiner* — Hien D Khuu
(74) *Attorney, Agent, or Firm* — SoraIP, Inc.

(57) ABSTRACT

A control device for power supply during traveling has a processor, acquires control information from the vehicle, and controls the biometric detector provided in the power supply lane that transmits electric power to the vehicle while traveling based on the control information.

3 Claims, 9 Drawing Sheets

CONTROL DEVICE FOR POWER SUPPLY DURING TRAVELING

CROSS-REFERENCE TO RELATED APPLICATION

This application claims priority to Japanese Patent Application No. 2023-013742 filed on Feb. 1, 2023, incorporated herein by reference in its entirety.

BACKGROUND

1. Technical Field

The present disclosure relates to a control device for power supply during traveling.

2. Description of Related Art

In Japanese Unexamined Patent Application Publication No. 2019-129541 (JP 2019-129541 A), a technique is disclosed that limits electric power supplied to a vehicle when at least one of in-vehicle information indicating that a living body is present in the vehicle and peripheral information indicating that a living body is present near a power supply unit is acquired.

SUMMARY

As in the technique disclosed in JP 2019-129541 A, electric power consumption increases when biometric detection is always performed. Therefore, there is room for improvement.

The present disclosure has been made in view of the above, and an object of the present disclosure is to provide a control device for power supply during traveling that is able to appropriately perform biometric detection while suppressing electric power consumption.

The control device for power supply during traveling according to the present disclosure includes a processor configured to acquire control information from a vehicle, and perform, based on the control information, control of a biometric detector provided in a power supply lane that transmits electric power to the vehicle that is traveling.

According to the present disclosure, it is possible to appropriately perform biometric detection while suppressing electric power consumption.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control device for power supply during traveling according to an embodiment of the present disclosure will be described with reference to the drawings. Components in the following embodiments include components that can be easily replaced by those skilled in the art, or components that are substantially the same.

Wireless Electric Power Transmission System

A wireless electric power transmission system to which a control device for power supply during traveling according to an embodiment is applied will be described with reference to FIGS. 1 to 8.

Figure 1:
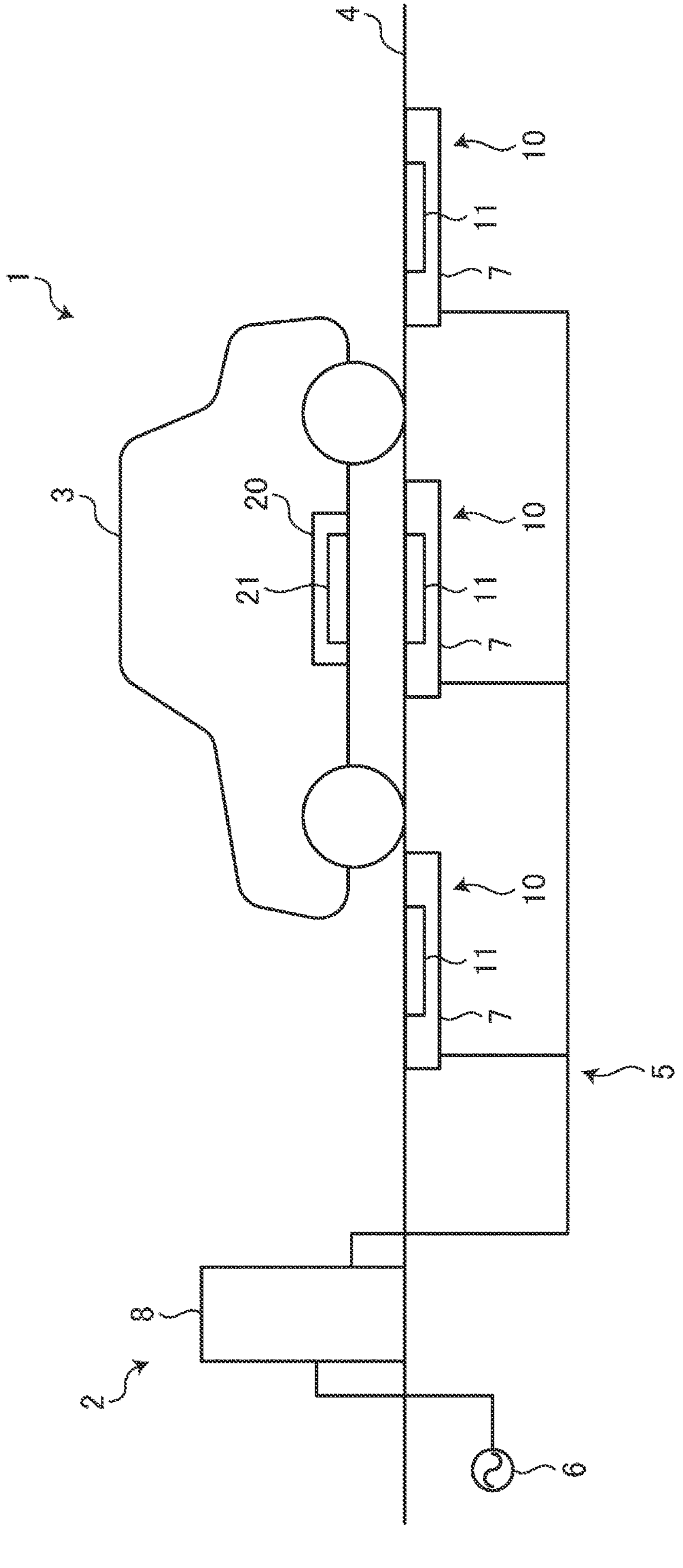
FIG. 1 is a schematic diagram showing a wireless electric power transmission system to which a control device for power supply during traveling according to an embodiment is applied.

FIG. 1 is a schematic diagram showing a wireless electric power transmission system according to an embodiment. A wireless electric power transmission system 1 comprises a supply facility 2 and a vehicle 3. The supply facility 2 is a facility that supplies electric power to the traveling vehicle 3 in a contactless manner. The vehicle 3 is an electrified vehicle that can be charged with electric power supplied from an external power source, such as a battery electric vehicle (BEV) or a plug-in hybrid electric vehicle (PHEV).

This wireless electric power transmission system 1 performs wireless electric power transmission from a supply facility 2 to a vehicle 3 by magnetic resonance coupling (magnetic field resonance). A wireless electric power transmission system 1 transmits electric power from a supply facility 2 to a vehicle 3 traveling on a road 4 in a contactless manner. In other words, the wireless electric power transmission system 1 transmits electric power by a magnetic resonance method, and realizes power feeding to the vehicle 3 while the vehicle 3 is traveling by using magnetic resonance coupling (magnetic resonance). The wireless electric power transmission system 1 can also be expressed as a dynamic wireless electric power transmission (D-WPT) system or a magnetic field dynamic wireless electric power transmission (MF-D-WPT) system.

The supply facility 2 includes a supply device 5 and an AC power supply 6 that supplies electric power to the supply device 5. The supply device 5 transmits electric power supplied from the AC power supply 6 to the vehicle 3 in a contactless manner. The AC power supply 6 is, for example, a commercial power supply. This supply device 5 comprises a power transmission device 10 having a primary coil 11.

The supply device 5 includes a segment 7 including the primary coil 11 and a management device 8 that manages the segment 7. Segment 7 is embedded within the lane of road 4. A management device 8 is installed on the side of the road 4. Segment 7 is electrically connected to management device 8. The management device 8 is electrically connected to the AC power supply 6 and supplies electric power from the AC power supply 6 to the segment 7. Segment 7 is electrically connected to AC power supply 6 via management device 8. A plurality of segments 7 can be arranged along the lanes of the road 4. For example, as shown in FIG. 1, the supply device 5 includes three segments 7 arranged side by side along the lane on the road 4 and one management device 8 to which the three segments 7 are connected. The segment 7 has the function of contactlessly transmitting electric power from the supply device 5 to the vehicle 3. Management device 8 has the function of controlling wireless electric power transmission in segment 7.

Vehicle 3 includes power reception device 20 having secondary coil 21. The power reception device 20 is provided on the bottom of the vehicle body of the vehicle 3. When the vehicle 3 travels on the road 4 on which the primary coil 11 is installed, the ground-side primary coil 11 and the vehicle-side secondary coil 21 vertically face each other. The wireless electric power transmission system 1 wirelessly transmits electric power from the primary coil 11 of the power transmission device 10 to the secondary coil 21 of the power reception device 20 while the vehicle 3 is traveling on the road 4.

The term "traveling" in this description means that the vehicle 3 is positioned on the road 4 for traveling. A state in which the vehicle 3 is temporarily stopped on the road 4 is also included during traveling. For example, a state in which the vehicle 3 is stopped on the road 4 due to waiting for a traffic light, etc., is also included in traveling. On the other hand, even if the vehicle 3 is located on the road 4, for example, if the vehicle 3 is parked or stopped, it is not included in traveling.

Also, in this description, the lane in which the primary coil 11 (segment 7) is embedded is described as a D-WPT lane, and it is a partial section of the road 4 where wireless electric power transmission by the supply device 5 is possible. This may be referred to as a D-WPT charging site. In the D-WPT lane and the D-WPT charging site, a plurality of primary coils 11 (plurality of segments 7) are arranged in the traveling direction of the vehicle 3 over a predetermined section of the road 4.

Figure 2:
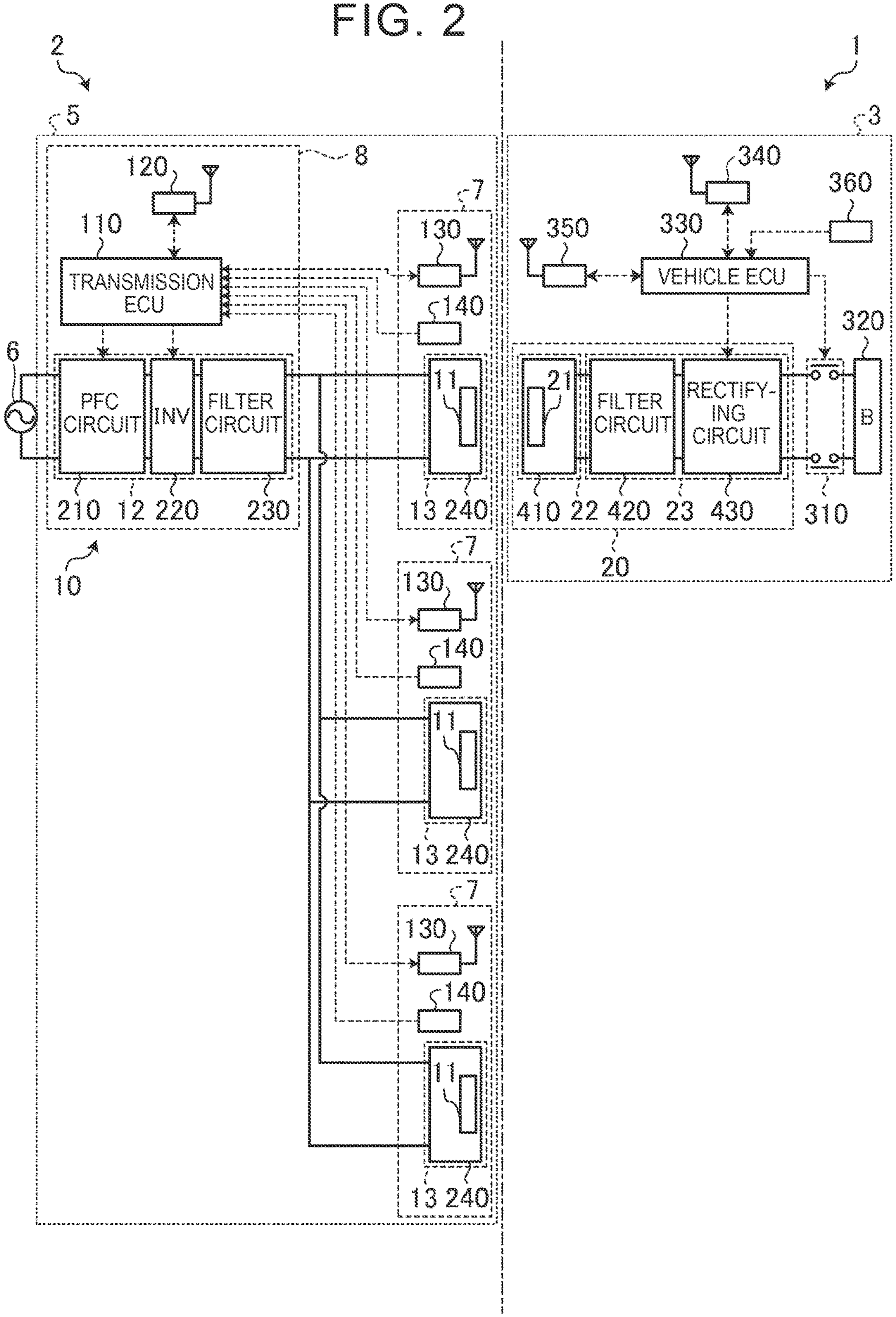
FIG. 2 is a diagram showing the overall configuration of the wireless electric power transmission system.

FIG. 2 is a diagram showing the overall configuration of the wireless electric power transmission system. In the supply facility 2, a supply device 5 and an AC power supply 6 are electrically connected. In supply device 5, segment 7 and management device 8 are electrically connected.

The supply device 5 includes a configuration provided in the management device 8 and a configuration provided in the segment 7. The supply device 5 includes a power transmission device 10, a power transmission Electronic Control Unit 110 (power transmission ECU), a first communication device 120, a second communication device 130, and a foreign object detection device 140. Note that it is not essential that the supply device 5 includes the foreign object detection device 140, and the supply device 5 may not include the foreign object detection device 140.

Power transmission device 10 includes an electrical circuit connected to AC power source 6. The power transmission device 10 includes a power factor collection circuit 210 (PFC circuit), an inverter (INV) 220, a filter circuit 230 and a power transmission side resonance circuit 240.

PFC circuit 210 improves the power factor of AC power input from AC power supply 6, converts the AC power into DC power, and outputs the DC power to inverter 220. This PFC circuit 210 is configured including an AC/DC converter. PFC circuit 210 is electrically connected to AC power supply 6.

Inverter 220 converts the DC power input from PFC circuit 210 into AC power. Each switching element of inverter 220 is composed of an Insulated Gate Bipolar Transistor (IGBT), a Metal-Oxide-Semiconductor Field Effect Transistor (MOSFET), or the like, and performs a switching operation according to a control signal from power transmission ECU 110. For example, the driving frequency of inverter 220 is 85 kHz. Inverter 220 outputs the converted AC power to filter circuit 230.

The filter circuit 230 removes noise contained in the alternating current input from the inverter 220 and supplies the noise-removed alternating current power to the power transmission side resonance circuit 240. Filter circuit 230 is an LC filter that combines a coil and a capacitor. For example, the filter circuit 230 is composed of a T-type filter in which two coils and one capacitor are arranged in a T-shape. PFC circuit 210, inverter 220, and filter circuit 230 configure electric power conversion section 12 of power transmission device 10.

The power transmission side resonance circuit 240 is a power transmission unit that transmits the AC power supplied from the filter circuit 230 to the power reception device 20 in a non-contact manner. When AC power is supplied from the filter circuit 230 to the power transmission side resonance circuit 240, a current flows through the primary coil 11 and a magnetic field for power transmission is generated.

The power transmission side resonance circuit 240 includes a primary coil 11 and a resonance capacitor. The primary coil 11 is a power transmission coil. This resonance capacitor is connected in series to one end of the primary coil 11 and adjusts the resonance frequency of the power transmission side resonance circuit 240. This resonant frequency is between 10 kHz and 100 GHz, preferably 85 kHz. For example, the power transmission device 10 is configured such that the resonance frequency of the power transmission side resonance circuit 240 and the drive frequency of the inverter 220 match. The power transmission side resonance circuit 240 constitutes the primary device 13 of the power transmission device 10.

The power transmission device 10 includes an electric power conversion unit 12 and a primary device 13. Electric power conversion unit 12 includes a PFC circuit 210, an inverter 220 and a filter circuit 230. The primary device 13 includes a power transmission side resonance circuit 240. The power transmission device 10 has a configuration in which an electric power conversion unit 12 is provided in the management device 8 and a primary device 13 is provided in the segment 7.

In the supply device 5, the electric power conversion unit 12 of the power transmission device 10, the power transmission ECU 110, and the first communication device 120 are provided in the management device 8, and the primary device 13 of the power transmission device 10, the second communication device 130, and a foreign object detection device (foreign object detector) 140 are provided in the segment 7.

The power transmission ECU 110 is an electronic control device that controls the supply device 5. Power transmission ECU 110 includes a processor and a memory. The processor consists of a Central Processing Unit (CPU), a Digital Signal Processor (DSP), a Field-Programmable Gate Array (FPGA), and so on. The memory is the main storage device and consists of Random Access Memory (RAM), Read Only Memory (ROM), and the like. The power transmission ECU 110 loads a program stored in a storage unit into a work area of a memory (main storage device) and executes it, and controls each component through the execution of the program to achieve a function that meets a predetermined purpose. The storage unit is composed of recording media such as Erasable Programmable ROM (EPROM), Hard Disk Drive (HDD), and removable media. Removable media include disk recording media such as Universal Serial Bus memory (USB memory), Compact Disc (CD), Digital Versatile Disc (DVD), and Blu-ray (registered trademark) Disc (BD). The storage unit can store an operating system (OS), various programs, various tables, various databases, and the like. Signals from various sensors are input to the power transmission ECU 110. A signal from foreign object detection device 140 is input to power transmission ECU 110. Power transmission ECU 110 then executes various controls based on signals input from various sensors.

For example, power transmission ECU 110 executes electric power control to adjust electric power for transmission. In electric power control, the power transmission ECU 110 controls the power transmission device 10. The power transmission ECU 110 outputs a control signal to the electric power conversion unit 12 in order to control the electric power supplied from the electric power conversion unit 12 to the primary device 13. Power transmission ECU 110 controls switching elements included in PFC circuit 210 to adjust electric power for transmission, and controls switching elements included in inverter 220 to adjust electric power for transmission.

The power transmission ECU 110 also executes communication control for controlling communication with the vehicle 3. In communication control, power transmission ECU 110 controls first communication device 120 and second communication device 130.

The first communication device 120 is a ground-side communication device that performs wide-area wireless communication. The first communication device 120 performs wireless communication with the vehicle 3 that is traveling on the road 4 and that is before approaching the WPT lane. The state before approaching the WPT lane means that the vehicle 3 is in a position where short-range wireless communication cannot be performed with the supply device 5.

Wide-area wireless communication is communication with a communication distance of 10 meters to 10 kilometers. Wide-area wireless communication is communication with a longer communication distance than narrow-area wireless communication. Various types of wireless communication with long communication distances can be used as wide-area wireless communication. For example, communication conforming to communication standards such as 3GPP (registered trademark), 4G, LTE, 5G, and WiMAX established by IEEE is used for wide area wireless communication. In the wireless electric power transmission system 1, vehicle information associated with vehicle identification information (vehicle ID) is transmitted from the vehicle 3 to the supply device 5 using wide area wireless communication.

The second communication device 130 is a communication device on the ground side that performs short-range wireless communication. The second communication device 130 performs wireless communication with a vehicle 3 that is approaching or entering the WPT lane among the vehicles 3 traveling on the road 4. A state in which the vehicle 3 is close to the WPT lane means that the vehicle 3 is in a position where short-range wireless communication can be performed with the supply device 5.

Short-range wireless communication is communication with a communication range of less than 10 meters. Short-range wireless communication is communication with a shorter communication distance than wide-area wireless communication. Various short-range wireless communications with short communication distances can be used as short-range wireless communications. For example, communication conforming to any communication standard established by IEEE, ISO, IEC, etc. is used for short-range wireless communication. As an example, Wi-Fi (registered trademark), Bluetooth (registered trademark), ZigBee (registered trademark), etc. are used for short-range wireless communication. Alternatively, Radio Frequency Identification (RFID), Dedicated Short Range Communication (DSRC), or the like may be used as a technique for performing short-range wireless communication. In the wireless electric power transmission system 1, vehicle identification information and the like are transmitted from the vehicle 3 to the supply device 5 using short-range wireless communication.

A foreign object detection device 140 detects a metallic foreign object, a living body, or the like existing above the primary coil 11. The foreign object detection device 140 is composed of, for example, a sensor coil and an imaging device installed on the ground. The foreign object detection device 140 is for exerting a foreign object detection (FOD) and a living object protection (LOP) in the wireless electric power transmission system 1.

In the supply device 5, the configuration of the power transmission device 10 is divided into a segment 7 and a management device 8, and the three segments 7 are connected to one management device 8. The power transmission device 10 is configured such that one inverter supplies electric power to three power transmission side resonance circuits 240. In the supply device 5, signals from each segment 7 are input to the management device 8. Signals from second communication device 130 and foreign object detection device 14 provided in the first segment are input to power transmission ECU 110. Similarly, signals from second communication device 130 and foreign object detection device 14 provided in the second segment are input to power transmission ECU 110. Signals from second communication device 130 and foreign object detection device 14 provided in the third segment are input to power transmission ECU 110. Power transmission ECU 110 can grasp the state of each segment 7 based on the signal input from each segment 7.

Vehicle 3 includes power reception device 20, charging relay 310, battery 320, vehicle ECU 330, third communication device 340, fourth communication device 350, and Global Positioning System (GPS) receiver 360.

The power reception device 20 supplies the electric power received from the power transmission device 10 to the battery 320. Power reception device 20 is electrically connected to battery 320 via charging relay 310. The power reception device 20 includes a power receiving side resonance circuit 410, a filter circuit 420, and a rectifying circuit 430.

The power receiving side resonance circuit 410 is a power receiving unit that receives electric power wirelessly transmitted from the power transmission device 10. The power receiving side resonance circuit 410 is configured by a power receiving side resonance circuit including a secondary coil 21 and a resonance capacitor. The secondary coil 21 is a power receiving coil that receives electric power transmitted from the primary coil 11 in a non-contact manner. This resonance capacitor is connected in series to one end of the secondary coil 21 and adjusts the resonance frequency of the power receiving side resonance circuit. The resonance frequency of the power receiving side resonance circuit 410 is determined to match the resonance frequency of the power transmission side resonance circuit 240.

The resonance frequency of the power receiving side resonance circuit 410 is the same as the resonance frequency of the power transmission side resonance circuit 240. Therefore, when a magnetic field is generated by the power transmission side resonance circuit 240 while the power receiving side resonance circuit 410 faces the power transmission side resonance circuit 240, the vibration of the magnetic field is transmitted to the power receiving side resonance circuit 410. The primary coil 11 and the secondary coil 21 will be in a resonance state. When an induced current flows through the secondary coil 21 due to electromagnetic induction, an induced electromotive force is generated in the power receiving side resonance circuit 410. The power receiving side resonance circuit 410 receives the electric power transmitted in a contactless manner from the power transmission side resonance circuit 240 in this manner. Then, the power receiving side resonance circuit 410 supplies the electric power received from the power transmission side resonance circuit 240 to the filter circuit 420. The power receiving side resonance circuit 410 constitutes the secondary device 22 of the power reception device 20.

The filter circuit 420 removes noise contained in the AC current input from the power receiving side resonance circuit 410 and outputs the noise-free AC power to the rectifying circuit 430. Filter circuit 420 is an LC filter that combines a coil and a capacitor. For example, the filter circuit 420 is composed of a T-type filter in which two coils and one capacitor are arranged in a T-shape.

Rectifying circuit 430 converts the AC power input from filter circuit 420 into DC power and outputs the DC power to battery 320. The rectifying circuit 430 is composed of, for example, a full-bridge circuit in which four diodes are connected as rectifier elements. A switching element is connected in parallel to each diode of the rectifying circuit 430. Each switching element of the rectifying circuit 430 is composed of an IGBT and performs a switching operation according to a control signal from the vehicle ECU 330. Rectifying circuit 430 supplies the converted DC power to battery 320. Filter circuit 420 and rectifying circuit 430 configure electric power conversion section 23 of power reception device 20.

The power reception device 20 includes a secondary device 22 and an electric power converter 23. The secondary device 22 includes a power receiving side resonance circuit 410. Electric power conversion unit 23 includes a filter circuit 420 and a rectifying circuit 430.

Charging relay 310 is provided between rectifying circuit 430 and battery 320. Charging relay 310 is controlled to be opened or closed by vehicle ECU 330. When the battery 320 is charged by the power transmission device 10, the charging relay 310 is controlled to be closed. When charging relay 310 is closed, rectifying circuit 430 and battery 320 are electrically connected. When charging relay 310 is open, the connection between rectifying circuit 430 and battery 320 is disabled. For example, when charging relay 310 is in an open state, vehicle 3 does not request power supply.

The battery 320 is a rechargeable DC power supply, and is composed of, for example, a lithium ion battery or a nickel metal hydride battery. The battery 320 stores electric power supplied from the power transmission device 10 to the power reception device 20. Also, the battery 320 can supply electric power to the driving motor of the vehicle 3. The battery 320 is electrically connected to the traction motor via a Power Control Unit (PCU). The PCU is an electric power conversion device that converts the DC power of the battery 320 into AC power and supplies it to the driving motor. Each switching element of the PCU is composed of an IGBT, and performs a switching operation according to a control signal from the vehicle ECU 330 or the like.

Vehicle ECU 330 is an electronic control device that controls vehicle 3. The vehicle ECU 330 has the same hardware configuration as the power transmission ECU 110. Signals from various sensors mounted on the vehicle 3 are input to the vehicle ECU 330. A positioning signal received by a GPS receiver 360 is also input to the vehicle ECU 330. The vehicle ECU 330 can acquire current position information of the vehicle 3 from the GPS receiver 360. Vehicle ECU 330 executes various controls based on signals input from various sensors.

For example, the vehicle ECU 330 performs contactless charging control to transmit electric power from the primary coil 11 to the secondary coil 21 in a contactless manner and store the electric power received by the secondary coil 21 in the battery 320. In contactless charging control, vehicle ECU 330 controls rectifying circuit 430, charging relay 310, third communication device 340 and fourth communication device 350. The non-contact charging control includes electric power control for controlling charging electric power and communication control for controlling communication with the supply device 5. In electric power control, vehicle ECU 330 controls switching elements included in rectifying circuit 430 to adjust electric power (charging electric power) supplied from power reception device 20 to battery 320. In communication control, vehicle ECU 330 controls third communication device 340 and fourth communication device 350.

The third communication device 340 is a vehicle-side communication device that performs wide-area wireless communication. The third communication device 340 wirelessly communicates with the first communication device 120 of the supply device 5 before the vehicle 3 traveling on the road 4 approaches the WPT lane. Wide area wireless communication is two-way wireless communication. Communication between the first communication device 120 and the third communication device 340 is performed by high-speed wireless communication.

The fourth communication device 350 is a vehicle-side communication device that performs short-range wireless communication. The fourth communication device 350 wirelessly communicates with the second communication device 130 of the supply device 5 when the vehicle 3 approaches or enters the WPT lane. Short-range wireless communication is unidirectional wireless signaling. Unidirectional wireless signaling is Point to point signaling (P2PS). P2PS is used for notifying vehicle identification information from the vehicle 3 to the supply device 5 in each activity of pairing, alignment check, magnetic coupling check, electric power transmission end, and electric power transmission end. P2PS can also be used as a lateral alignment check. The lateral direction is the width direction of the lane, and the width direction of the vehicle 3.

GPS receiver 360 detects the current position of vehicle 3 based on positioning information obtained from a plurality of positioning satellites. Current position information of the vehicle 3 detected by the GPS receiver 360 is transmitted to the vehicle ECU 330.

In addition, in the supply device 5, the filter circuit 230 may be included in the management device 8 instead of the segment 7. That is, the filter circuit 230 may be installed on the side of the road 4. In this case, the electric power conversion unit 12 includes a PFC circuit 210, an inverter

220 and a filter circuit 230, and the primary device 13 includes a power transmission side resonance circuit 240.

Further, the filter circuit 230 may be provided individually for each primary coil 11 or may be provided collectively for a plurality of primary coils 11.

Moreover, the filter circuit 230 is not limited to a T-type filter, and may be, for example, a band-pass filter in which a coil and a capacitor are connected in series. This is the same for the filter circuit 420 of the vehicle 3 as well.

Further, in the power transmission device 10, when the inverter 220 is connected to the plurality of primary coils 11, each primary device 13 may be provided with a switch for switching the primary coil 11 to be energized. This changeover switch may be provided in the management device 8 beside the road 4 or may be provided near the primary coil 11.

Moreover, the power transmission side resonance circuit 240 is not limited to the configuration in which the primary coil 11 and the resonance capacitor are connected in series. The primary coil 11 and resonant capacitor may be connected in parallel, or may be a combination of parallel and series. In short, the power transmission side resonance circuit 240 only needs to be configured such that the resonance frequency of the power transmission side resonance circuit 240 matches the driving frequency of the inverter 220, and the connection relationship of the components is not particularly limited. The same applies to the power receiving side resonance circuit 410 of the vehicle 3.

Further, the drive frequency of inverter 220 is not limited to 85 kHz, and may be a frequency around 85 kHz. In short, the driving frequency of inverter 220 may be a predetermined frequency band including 85 kHz.

Further, the power transmission device 10 may have a configuration in which a plurality of inverters 220 are connected to the output side electric power line (DC power line) of the PFC circuit 210.

Moreover, the foreign object detection device 140 may be provided not only on the ground side but also on the vehicle 3 side. For example, when a foreign object detection device on the side of the vehicle 3 detects a foreign object or a living body existing above the primary coil 11, the power supply request can be stopped until the vehicle 3 passes the primary coil 11.

In the wireless electric power transmission system 1, information transmitted from the vehicle 3 to the supply device 5 using short-range wireless communication includes vehicle identification information, a power supply request, a power supply request value, and the like. A power supply request is information indicating a request for electric power transmission from the primary coil 11. The power supply request value is a request value for the amount of electric power transmitted from the supply device 5 to the vehicle 3. Vehicle ECU 330 can calculate the power supply request value based on the SOC of battery 320.

Moreover, the wireless electric power transmission system 1 is not limited to the method of supplying power from the ground to the vehicle 3, and can realize the method of supplying power from the vehicle 3 to the ground. In this case, the rectifying circuit 430 can be replaced with an inverter to achieve rectification during electric power supply and power reception.

Figure 3:
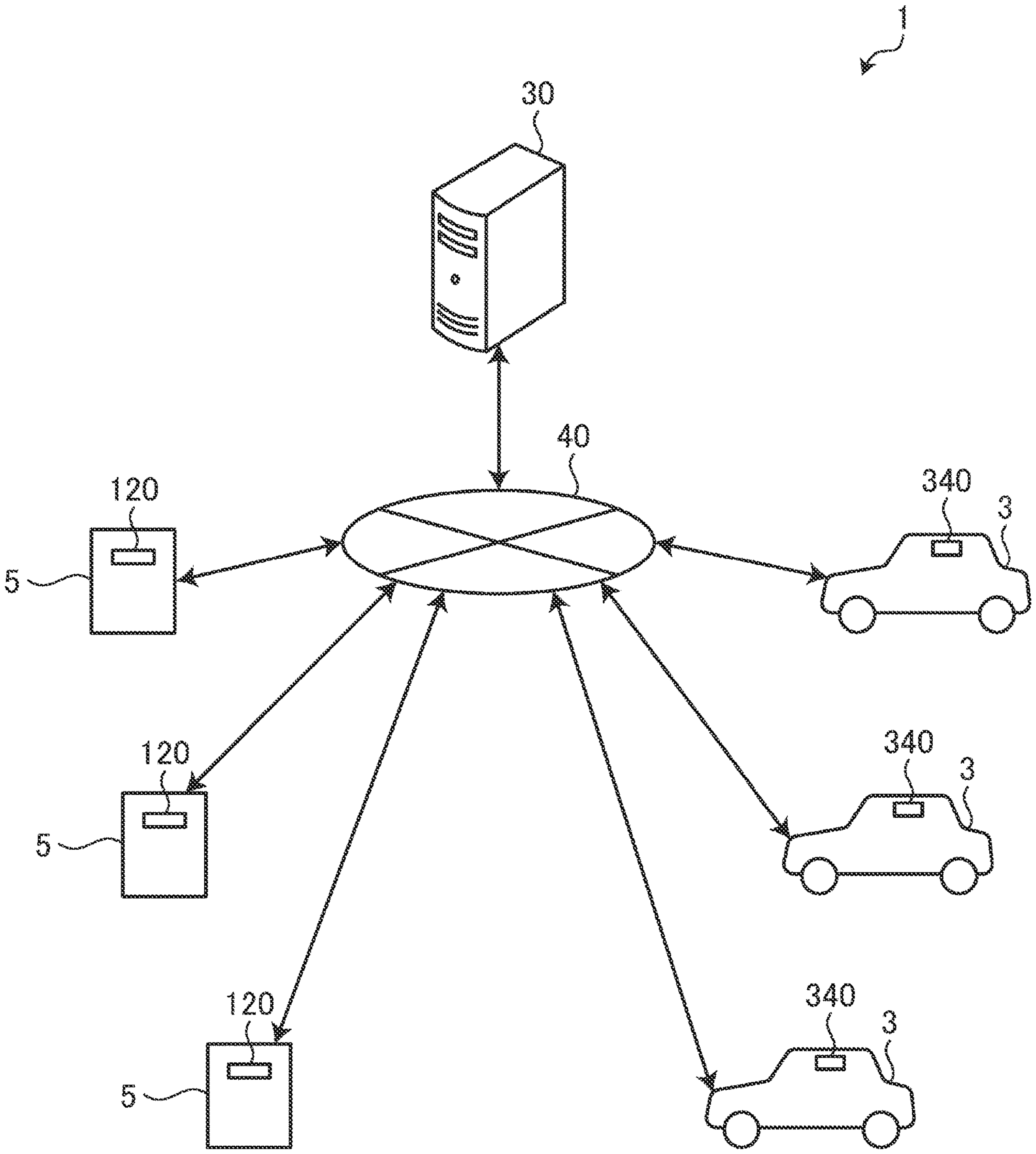
FIG. 3 is a schematic diagram for explaining wide-area wireless communication in the wireless electric power transmission system.

FIG. 3 is a schematic diagram for explaining wide-area wireless communication in the wireless electric power transmission system.

In the wireless electric power transmission system 1, the vehicle 3 can communicate with the server 30 and the supply device 5 can communicate with the server 30. The server 30 is connected to a network 40 and can communicate with multiple vehicles 3 and multiple supply devices 5 via the network 40. The network 40 is composed of a Wide Area Network (WAN), which is a public communication network such as the Internet, a telephone communication network of mobile phones, and the like.

The vehicle 3 connects to the network 40 through wide area wireless communication using the third communication device 340. Vehicle 3 transmits information to server 30 and receives information from server 30.

The supply device 5 connects to the network 40 by wide area wireless communication using the first communication device 120. The supply device 5 transmits information to the server 30 and receives information from the server 30.

Figure 4:
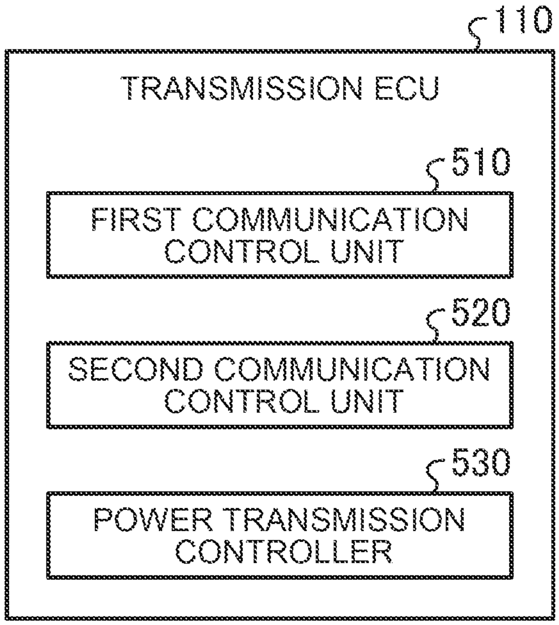
FIG. 4 is a block diagram for explaining the functional configuration of the power transmission ECU.

FIG. 4 is a block diagram showing the functional configuration of the power transmission ECU. Power transmission ECU 110 includes first communication control section 510, second communication control section 520, and power transmission control section 530.

The first communication control unit 510 executes first communication control for controlling the first communication device 120. The first communication control controls wide-area wireless communication on the supply device 5 side, and controls communication of the supply device 5 using the first communication device 120. That is, the first communication control controls communication of the management device 8 of the supply device 5. The first communication control controls communication between the supply device 5 and the network 40 and controls communication between the supply device 5 and the server 30 via the network 40. The first communication control unit 510 is a Supply Equipment Communication Controller (SECC).

The second communication control unit 520 executes second communication control for controlling the second communication device 130. The second communication control controls short-range wireless communication on the supply device 5 side, and controls communication of the supply device 5 using the second communication device 130. That is, the second communication control controls communication of the segment 7 of the supply device 5. The second communication control controls communication between the supply device 5 and the vehicle 3 as communication not via the network 40. The second communication control unit 520 is a Primary Device Communication Controller (PDCC).

The power transmission control unit 530 executes power transmission control for controlling the power transmission device 10. Power transmission control controls electric power for transmission, and controls the electric power conversion unit 12 of the power transmission device 10. Power transmission control unit 530 performs electric power control to control PFC circuit 210 and inverter 220.

Figure 5:
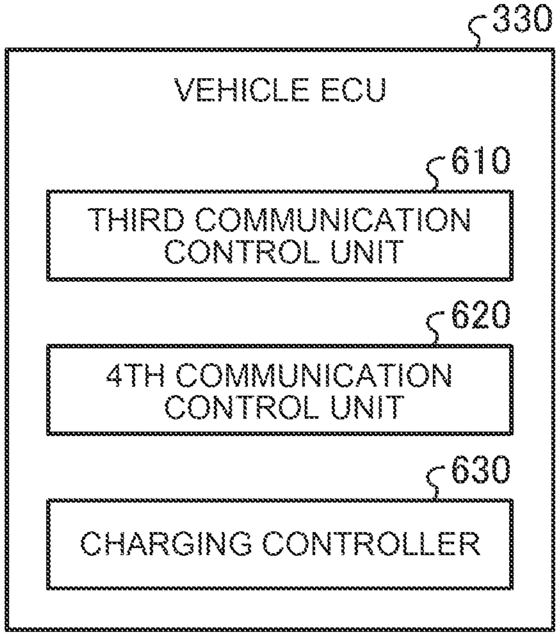
FIG. 5 is a block diagram for explaining the functional configuration of the vehicle ECU.

FIG. 5 is a block diagram showing the functional configuration of the vehicle ECU. Vehicle ECU 330 includes a third communication control unit 610, a fourth communication control unit 620, and a charging control unit 630.

The third communication control unit 610 executes third communication control for controlling the third communication device 340. The third communication control controls wide-area wireless communication on the vehicle 3 side, and controls communication of the vehicle 3 using the third communication device 340. The third communication control controls communication between the vehicle 3 and the network 40 and also controls communication between the vehicle 3 and the server 30 via the network 40. A third communication control unit 610 is an EV Communication Controller (EVCC).

The fourth communication control unit 620 executes fourth communication control for controlling the fourth communication device 350. The fourth communication control controls short-range wireless communication on the vehicle 3 side, and controls communication of the vehicle 3 using the fourth communication device 350. The fourth communication control controls communication between the vehicle 3 and the supply device 5 as communication not via the network 40. The fourth communication control unit 620 is a Secondary Device Communication Controller (SDCC).

Charging control unit 630 executes charging control to control power reception device 20 and charging relay 310. Charging control includes electric power control for controlling received electric power in power reception device 20 and relay control for controlling the connection state between secondary device 22 and battery 320. Charging control unit 630 performs electric power control to control rectifying circuit 430. Charging control unit 630 performs relay control to switch the open/closed state of charging relay 310.

In the wireless electric power transmission system 1 configured as described above, wireless electric power transmission from the supply device 5 to the vehicle 3 is performed in a state where wireless communication is established between the vehicle 3 and the supply device 5. In a state in which the vehicle 3 and the supply device 5 are paired by wireless communication, electric power is transmitted from the primary coil 11 on the ground side to the secondary coil 21 on the vehicle side in a non-contact manner. Then, in the vehicle 3, charging control is performed to supply the electric power received by the secondary coil 21 to the battery 320.

Next, the electric power transmission process (D-WPT process) will be described with reference to FIG. 6. The electric power transmission process is structured as a chain of activities, a process derived from states and corresponding transitions.

Figure 6:
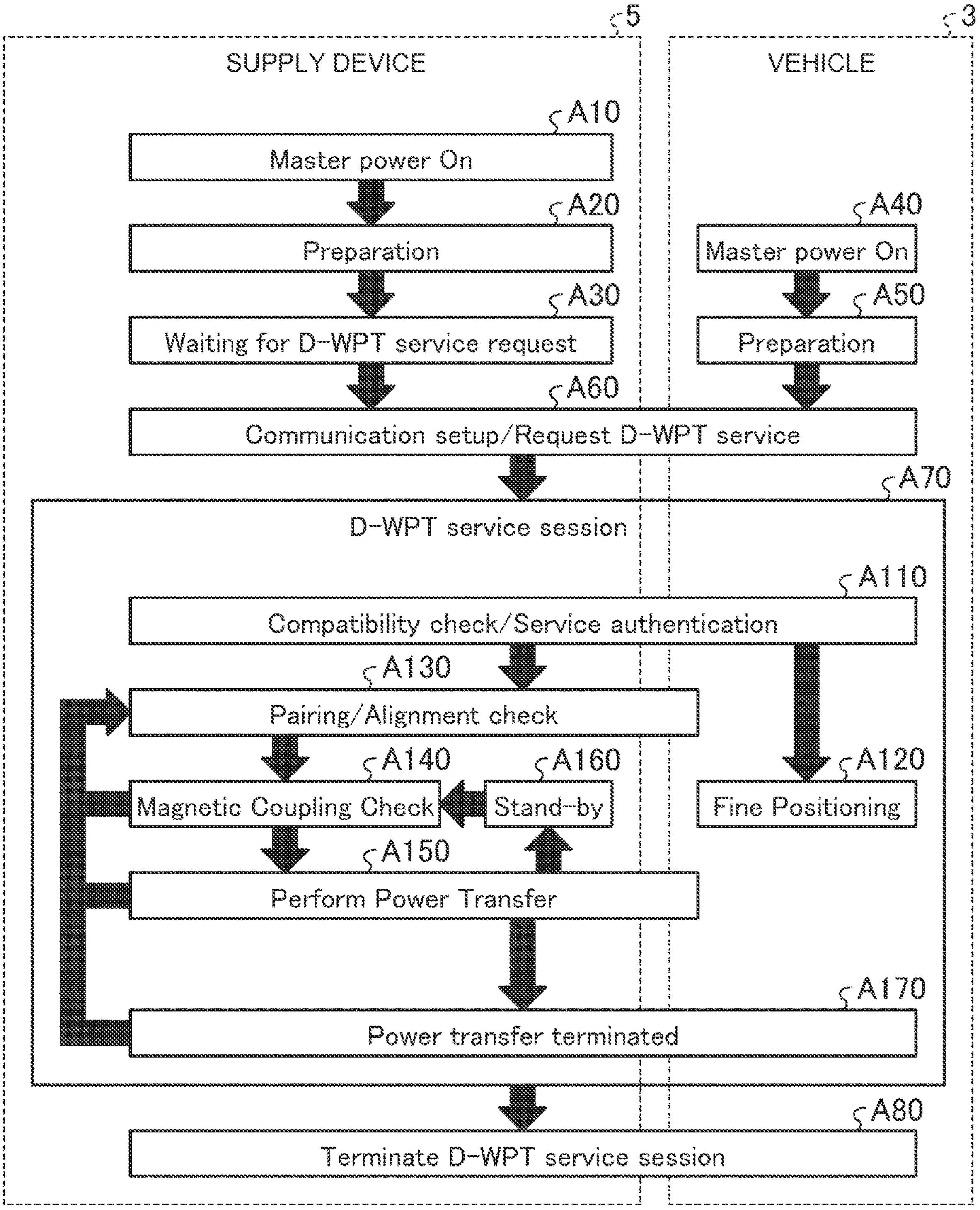
FIG. 6 is a diagram for explaining the electric power transmission process.

FIG. 6 is a diagram for explaining the electric power transmission process. FIG. 6 shows basic activities to explain the electric power transfer process. The thick arrows shown in FIG. 6 represent transition lines. The state of the wireless electric power transmission system 1 in the electric power transmission process is represented by the activities that make up the electric power transmission process.

The activities that make up the electric power transmission process are an electric power transmission service session (D-WPT service session A70) that is an activity in the stage of electric power transmission, an activity in the stage before electric power transmission, and an activity in the stage after electric power transmission. Further, the activity can be explained by dividing the subject of action according to the presence or absence of communication between the supply device 5 and the vehicle 3. Activities are divided into activities representing the state of only the supply device 5 side without communication, the state of only the vehicle 3 side without communication, and the state of both the supply device 5 and the vehicle 3 with communication.

As shown in FIG. 6, the activities include master power on state (MasterpowerOn) A10, preparation (Preparation) A20, waiting for request from vehicle 3 (WaitingforD-WPTservicerequest) A30, master power on state (MasterpowerOn) A40, Preparation A50, Communication setup and Request D-WPT service A60, D-WPT service session A70, and End of D-WPT service session (TerminateD-WPTservicesession) A80.

Preparation A20 is the preparation state of the supply device 5. In preparation A20, the supply device 5 performs circuit activation and safety confirmation without communication with the vehicle 3. The supply device 5 transitions to the preparation A20 state when the master power supply is turned on A10. Then, in the preparation A20, when the supply device 5 activates the circuit and confirms safety, the state transitions to waiting for a request from the vehicle 3 (WaitingforD-WPTservicerequest) A30. On the other hand, when there is a problem with the supply device 5, the supply device 5 notifies the vehicle 3 of information indicating that the wireless electric power transmission system 1 cannot be used (unusable notification) through wide area wireless communication. The first communication device 120 transmits a usage prohibition notice to the vehicle 3.

Preparation A50 is the preparation state of the vehicle 3. In preparation A50, the vehicle 3 performs circuit activation and safety checks without communication with the supply device 5. The vehicle 3 transitions to the state of preparation A50 when the master power supply is turned on A40. Then, in the preparation A50, when the vehicle 3 activates the circuit and confirms safety, the state transitions to communication setup (Communicationsetup) and D-WPT service request (RequestD-WPTservice) A60. On the other hand, if there is a problem with vehicle 3, vehicle 3 will not initiate wide area wireless communication and will not proceed with subsequent sequences in the D-WPT process.

Figure 7:
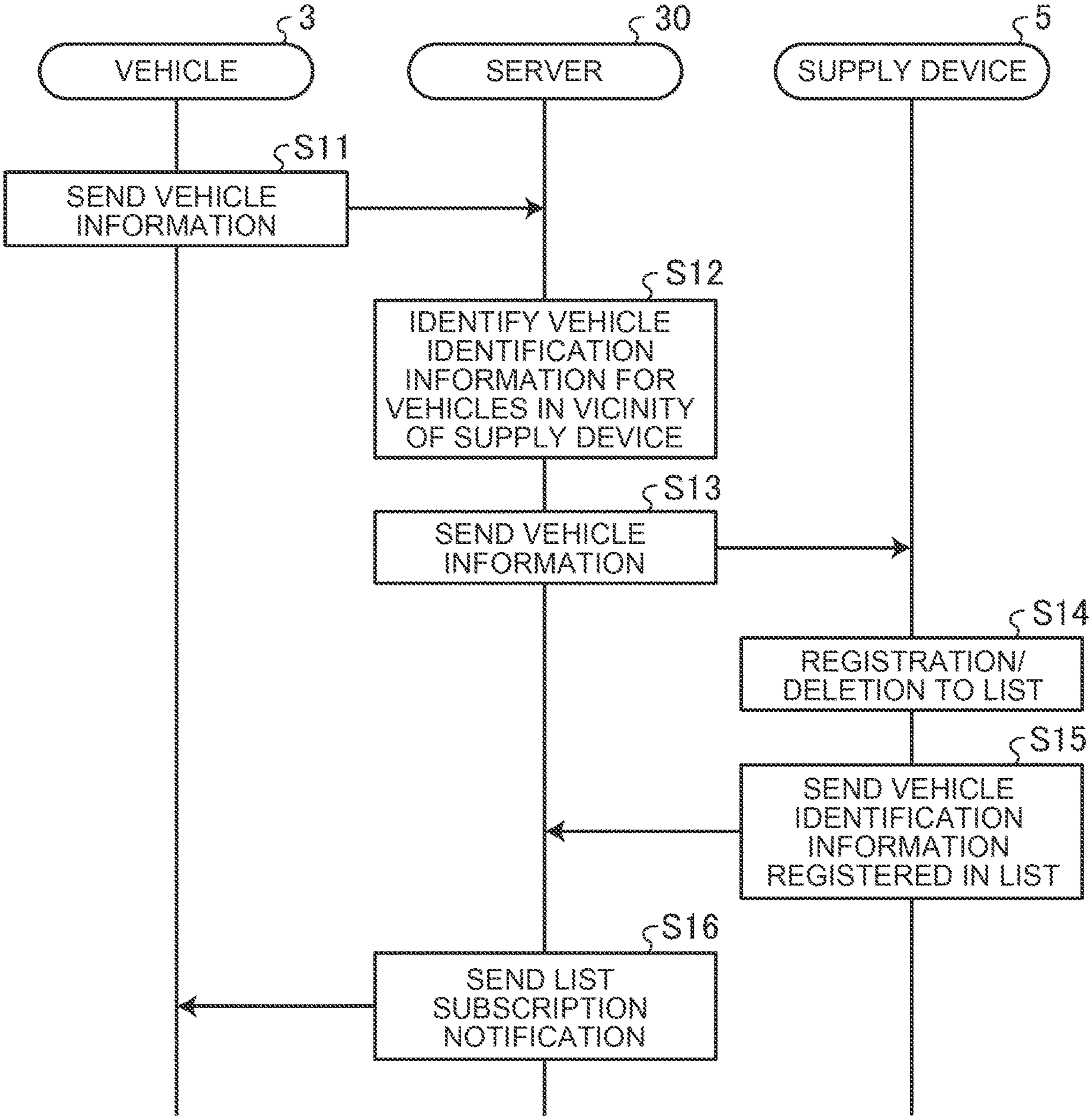
FIG. 7 is a sequence diagram showing a case where communication using wide area wireless communication is performed between the vehicle and the supply device.

A request for communication setup and D-WPT service A60 is initiated by vehicle ECU 330. At communication setup and D-WPT service request A60, vehicle ECU 330 initiates wide area wireless communication. First, when the vehicle 3 transitions from preparation A50 to communication setup and D-WPT service request A60, the third communication device 340 transmits a D-WPT service request signal. The third communication device 340 wirelessly communicates with the first communication device 120 corresponding to the D-WPT lane that the vehicle 3 is planning to enter or has entered. The first communication device 120 to communicate with is selected based on the relative positional relationship between the current position of the vehicle 3 and the position of the D-WPT lane. On the supply device 5 side, when the first communication device 120 receives the D-WPT service request signal in the state of waiting for a request from the vehicle 3 A30, the state transitions to the communication setting and D-WPT service request A60. Various types of information in wide area wireless communication and P2PS communication are linked using vehicle identification information. FIG. 7 shows the processing sequence of this communication setup and D-WPT service request A60.

FIG. 7 is a sequence diagram showing a case where communication using wide area wireless communication is performed between the vehicle and the supply device. The vehicle 3 transmits vehicle information to the server 30 (S11). In S11, the third communication device 340 of the vehicle 3 transmits vehicle information to the server 30. The vehicle information includes vehicle identification information, various parameters of the power reception device 20, current position information of the vehicle 3, and requested electric power. Vehicle ECU 330 calculates the required electric power based on the SOC (State Of Charge) of battery 320. In S11, the vehicle ECU 330 causes the third communication device 340 to transmit vehicle information at predetermined time intervals. The predetermined time is set according to the distance from the current position of the vehicle 3 to the starting point of the WPT lane. The shorter the distance from the vehicle 3 to the starting point of the WPT lane, the shorter the predetermined time interval.

When the server 30 receives the vehicle information from the vehicle 3, the server 30 specifies the vehicle identification information of the vehicle 3 located within the vicinity area of the supply device 5 based on the current position information of the vehicle 3 included in the vehicle information (S12). In S12, the server 30 identifies the vehicle 3 positioned within a predetermined vicinity area from the supply device 5 based on the current position information of the vehicle 3 and the position information of the supply device 5. The vicinity area is set within, for example, 500 meters.

After specifying the vehicle identification information of the vehicle 3, the server 30 transmits the vehicle information to the supply device 5 (S13). At S13, the transmission device of the server 30 transmits vehicle information to the supply device 5.

When the supply device 5 receives the vehicle information from the server 30, the supply device 5 registers/deletes the vehicle identification information in the identification information list (S14). In S14, the power transmission ECU 110 registers/deletes the vehicle identification information in the identification information list so that the vehicle identification information linked to the vehicle information is registered in the identification information list without excess or deficiency.

After registering/erasing the vehicle identification information in the identification information list, the supply device 5 transmits the vehicle identification information registered in the identification information list to the server 30 (S15). At S15, the first communication device 120 of the supply device 5 transmits the vehicle identification information to the server 30.

When the server 30 receives the vehicle identification information from the supply device 5, the server 30 transmits a list registration notification to the vehicle 3 corresponding to the vehicle identification information registered in the identification information list (S16). In S16, the communication device of server 30 transmits a list registration notification to vehicle 3. The list registration notification is a notification indicating that the vehicle identification information is registered in the identification information list, and includes identification information of the supply device 5 and position information of the supply device 5.

Thus, when the vehicle 3 starts wide area wireless communication and both the supply device 5 and the vehicle 3 are in the state of communication setting and D-WPT service request A60, the communication setting by wide area wireless communication is successful. When this communication setup succeeds, the state transitions to D-WPT service session A70.

Return to FIG. 6. The D-WPT service session A70 transmits electric power in a non-contact manner from the power transmission side resonance circuit 240 of the supply device 5 to the power receiving side resonance circuit 410 of the vehicle 3 in a state where the communication connection is established between the supply device 5 and the vehicle 3. The D-WPT service session A70 begins with successful communication setup and ends with the termination of communication. When communication ends in the D-WPT service session A70 state, the state transitions to Terminate D-WPT service session A80.

At the end of the D-WPT service session A80, the vehicle 3 terminates the wide area wireless communication with the supply device 5. The vehicle 3 and the supply device 5 can receive a trigger to terminate the D-WPT service session A70. Then, the vehicle ECU 330 prevents the secondary device 22 and the vehicle 3 from starting the D-WPT until the third communication device 340 receives the next notification (D-WPT service request signal).

The detailed activities of D-WPT service session A70 will now be described.

The D-WPT service session A70 includes a Compatibility check and Service authentication A110, a Fine Positioning A120, and a Pairing and Alignment check A130, Magnetic Coupling Check A140, Perform Power Transfer A150, Stand-by A160, and Power transfer terminated A170.

Compatibility check and service authentication A110 will be described. After successful communication setup, vehicle ECU 330 and power transmission ECU 110 confirm that primary device 13 and secondary device 22 are compatible. The compatibility check is performed on the supply device 5 side based on the information associated with the vehicle identification information acquired by communication. Check items include the minimum ground clearance of the secondary device 22, the shape type of the secondary device 22, the circuit topology of the secondary device 22, the self-resonant frequency of the secondary device 22, the number of secondary coils 21, and the like.

In the compatibility check and service authentication A110, first, the vehicle 3 transmits compatibility information of the power reception device 20 from the third communication device 340 to the supply device 5. The first communication device 120 of the supply device 5 receives the compatibility information of the power reception device 20 from the vehicle 3. Then, the first communication device 120 of the supply device 5 transmits the compatibility information of the power transmission device 10 to the vehicle 3. The third communication device 340 of the vehicle 3 receives the compatibility information of the power transmission device 10 from the supply device 5.

Elements of compatibility information that the vehicle 3 transmits to the supply device 5 include vehicle identification information, WPT Power Classes, Air Gap Class, WPT Operating Frequencies, WPT frequency adjustment, WPT Type, WPT Circuit Topology, Fine Positioning Method, Pairing Method, Alignment Method, electric power adjustment function presence/absence information, and the like.

Elements of compatibility information that supply device 5 sends to vehicle 3 include supply device identification, WPT electric power class, gap class, WPT drive frequency, WPT frequency adjustment, WPT type, WPT circuit topology, detailed alignment method, It includes the pairing method, the alignment method, information on the presence or absence of the electric power adjustment function, and the like.

Each element name is explained in detail. Each element of the compatibility information transmitted from the vehicle 3 to the supply device 5 will be described, and the description overlapping with the compatibility information transmitted from the vehicle 3 to the supply device 5 among the compatibility information transmitted from the supply device 5 to the vehicle 3 will be omitted.

A gap class is information indicating a gap class that the secondary device 22 can receive power from. The WPT electric power class is information indicating the power class that the secondary device 22 can receive. The WPT drive frequency is information indicating the frequency of received electric power received by the secondary device 22. The WPT frequency adjustment is information indicating whether or not the driving frequency can be adjusted. The WPT type is information indicating the shape type of the secondary device 22 and indicates the coil shape of the secondary coil 21. Examples of the WTP type include circular and solenoid. The WPT circuit topology is information indicating the connection structure between the secondary coil 21 and the resonant capacitor. WTP circuit topologies include series and parallel. The detailed alignment method is information indicating by what method the alignment is to be performed. The pairing method is a method of performing pairing by which the vehicle 3 identifies the supply device 5. The alignment method indicates a method of confirming the relative positions of the secondary device 22 and the primary device 13 before starting power transmission.

Fine Positioning A120 will be described. Vehicle 3 performs Fine Positioning A120 prior to pairing and alignment check A130 or in parallel with these activities. When the vehicle ECU 330 determines that the vehicle 3 has approached or entered the area (WPT lane) where the supply device 5 is installed, it begins Fine Positioning A120.

Vehicle ECU 330 guides vehicle 3 to align primary device 13 and secondary device 22 within a range that establishes sufficient magnetic coupling for wireless electric power transmission.

Fine Positioning A120 is basically performed manually or automatically on the vehicle 3 side. The Fine Positioning A120 can cooperate with ADAS (Automatic Driving Assistance System).

The Fine Positioning A120 activity then continues until the vehicle 3 leaves the D-WPT charging site or the state changes to end of communication, and the location data transmitted from the supply device 5 to the vehicle 3 by wide area wireless communication is It can be performed based on alignment information. This end of communication is the end A80 of the D-WPT service session.

Pairing/Alignment check A130 will now be described. Here, pairing and alignment check will be explained separately.

Explain pairing. A P2PS interface with short-range wireless communication ensures that the primary device 13 and the secondary device 22 are uniquely paired. The pairing state process is as follows.

First, the vehicle ECU 330 recognizes that the vehicle 3 has approached or entered the D-WPT lane. For example, the vehicle ECU 330 has map information including D-WPT lanes, compares it with the position information of the own vehicle obtained by the GPS receiver 360, and recognizes approach or entry based on the linear distance. The vehicle 3 transmits which D-WPT lane it has approached to the server 30 by wide area wireless communication. In short, the third communication device 340 notifies the cloud of a signal indicating that the vehicle 3 is approaching one of the D-WPT lanes. Further, if the vehicle ECU 330 recognizes the approach or entry of the vehicle 3 into the D-WPT lane, the fourth communication device 350 will start transmitting the modulated signal at regular intervals for pairing the primary device 13 and the secondary device 22.

Further, the supply device 5 may recognize that the vehicle 3 has approached or entered the D-WPT lane using information obtained from the server 30 through wide area wireless communication. The server 30 assigns the vehicle identification information of the vehicle 3 approaching in each D-WPT lane to the supply device 5 corresponding to that lane. Since the supply device 5 only needs to refer to the vehicle identification information whose number has been narrowed down by the server 30, the authentication process can be completed in a short time. When the supply device 5 recognizes that the vehicle 3 is approaching the D-WPT lane, the second communication device 130 goes into standby mode. In standby mode, it waits to receive a modulated signal from the fourth communication device 350 of the vehicle 3. This modulated signal contains vehicle identification information.

When the second communication device 130 receives the modulated signal from the vehicle 3, the supply device 5 compares the vehicle identification information received by the short-range wireless communication and the vehicle identification information in the identification information list obtained by a result of the wide-area wireless communication with the plurality of vehicles 3 approaching the D-WPT lane. By means of this comparison, supply device 5 identifies vehicle 3.

When the vehicle ECU 330 recognizes that the vehicle 3 is out of the D-WPT lane, it stops transmitting the modulated signal from the fourth communication device 350. Vehicle ECU 330 can determine whether the D-WPT lane has been passed based on the map information and the position information of the host vehicle.

When the supply device 5 determines that the vehicle 3 is not traveling in the D-WPT lane or determines that the vehicle 3 is not approaching the D-WPT lane, waiting for the modulated signal from the fourth communication device 350 is stopped.

Pairing is performed to the primary device 13 until the vehicle 3 exits the D-WPT charging site or the state changes to end of communication. When Pairing is complete, the state transitions to Alignment check.

Alignment check will be explained. The alignment check is intended to ensure that the lateral distance between the primary device 13 and the secondary device 22 is within tolerance. The alignment check is done using short range wireless communication (P2PS).

Alignment checks continue to be performed on a P2PS basis until the vehicle 3 leaves the D-WPT charging site or the state changes to End of Communication. The results of the alignment check can be transmitted from the first communication device 120 to the third communication device 340 via wide area wireless communication.

The Magnetic Coupling Check A140 will be explained. In the Magnetic Coupling Check A140, the supply device 5 confirms the magnetic coupling state and confirms that the secondary device 22 exists within the allowable range. When the Magnetic Coupling Check A140 ends, the state transitions to the Perform Power Transfer A150.

The Perform Power Transfer A150 will be described. In this state, the supply device 5 performs electric power transmission to the power reception device 20. The power transmission device 10 and the power reception device 20 need to have the ability to control the transmitted electric power (transmitted electric power and received electric power) for the usefulness of the MF-D-WPT and the protection of the power reception device 20 and the battery 320. Greater electric power transmission helps power reception device 20 travel longer distances without static wireless charging and conductive charging. However, the capacity of the battery 320 varies depending on the vehicle type of the vehicle 3, and the electric power demand for driving may fluctuate abruptly. This abrupt change includes abrupt regenerative braking. When the regenerative braking is performed while traveling in the D-WPT lane, the regenerative braking is given priority. Therefore, the received electric power from the power reception device 20 will be supplied to the battery 320 in addition to regenerative electric power. In this case, in order to protect the battery 320 from overcharging, it is necessary to adjust the transmitted electric power by the power reception device 20.

Despite the need for electric power control, no new communication is initiated between the supply device 5 and the power reception device 20 in this state. This is because communication can impair responsiveness and accuracy in electric power control due to its instability and latency. Therefore, the supply device 5 and the power reception device 20 perform electric power transmission and control based on known information up to this state.

The supply device 5 increases the transmitted electric power for the magnetic coupling check in advance in response to the electric power request transmitted from the third communication device 340 using wide area wireless communication. The supply device 5 attempts to keep the current and voltage fluctuations within its bounds while maximizing the electric power transmitted during the transition.

The power reception device 20 basically receives electric power transmitted from the power transmission device 10 without any control. However, the power reception device 20 starts control when the transmitted electric power exceeds or is about to exceed the limit, such as the rated power of the battery 320 that fluctuates according to the state of charge and the electric power demand for driving the vehicle 3. Further, electric power control in the vehicle ECU 330 is also required to cope with malfunctions in wide area wireless communication. This malfunction leads to a contradiction between the electric power control target in the primary device 13 and the request from the third communication device 340, and sudden failure of the power reception device 20 and the battery 320 during electric power transmission. The power reception device 20 controls the transmitted electric power under the electric power request rate notified by the first communication device 120.

Electric power requirements are determined based on compatibility check information such as vehicle 3 and primary device 13 WPT circuit topology, geometry, ground clearance, EMC (electromagnetic compatibility). The magnetic field differs according to these specifications, and it is necessary to transmit electric power within a range that satisfies EMC.

Electric power control in power transmission ECU 110 and power reception device 20 may interfere with each other. In particular, it may interfere if the supply device 5 attempts to achieve an electric power demand greater than the current electric power limit at the power reception device 20 via wide area wireless communication. An example of this is rapid regenerative control with a relatively small battery 320 in vehicle 3. If possible, it is desirable that the supply device 5 be able to detect mismatches between power control targets and limits and adjust electric power transmission to overcome the mismatches.

For example, if a foreign object on primary device 13 is detected by foreign object detection device 140, or if secondary device 22 is misaligned and the magnetic coupling is low, secondary device 22 is still above primary device 13. If electric power transmission is interrupted for a short period of time, the state transitions to Stand-by A160. In addition, when the vehicle 3 is provided with a foreign object detection device, the foreign object may be detected on the vehicle 3 side.

When the secondary device 22 passes over the primary device 13, the state transitions to End Power Transfer A170. In this case, less electric power is transmitted because the magnetic coupling between the two devices is weaker. Since the supply device 5 can detect that the magnetic coupling has weakened by monitoring the transmitted electric power, the supply device 5 basically determines the state transition to the end of power transmission A170, and then starts dropping of voltage to stop electric power transmission.

The Stand-by A160 will be explained. In this state the electric power transmission is briefly interrupted for some reason and when the D-WPT is ready in both the vehicle 3 and the supply device 5 the state returns to Perform Power Transfer A150. If the electric power transmission can be interrupted, the state becomes Stand-by A160.

Figure 8:
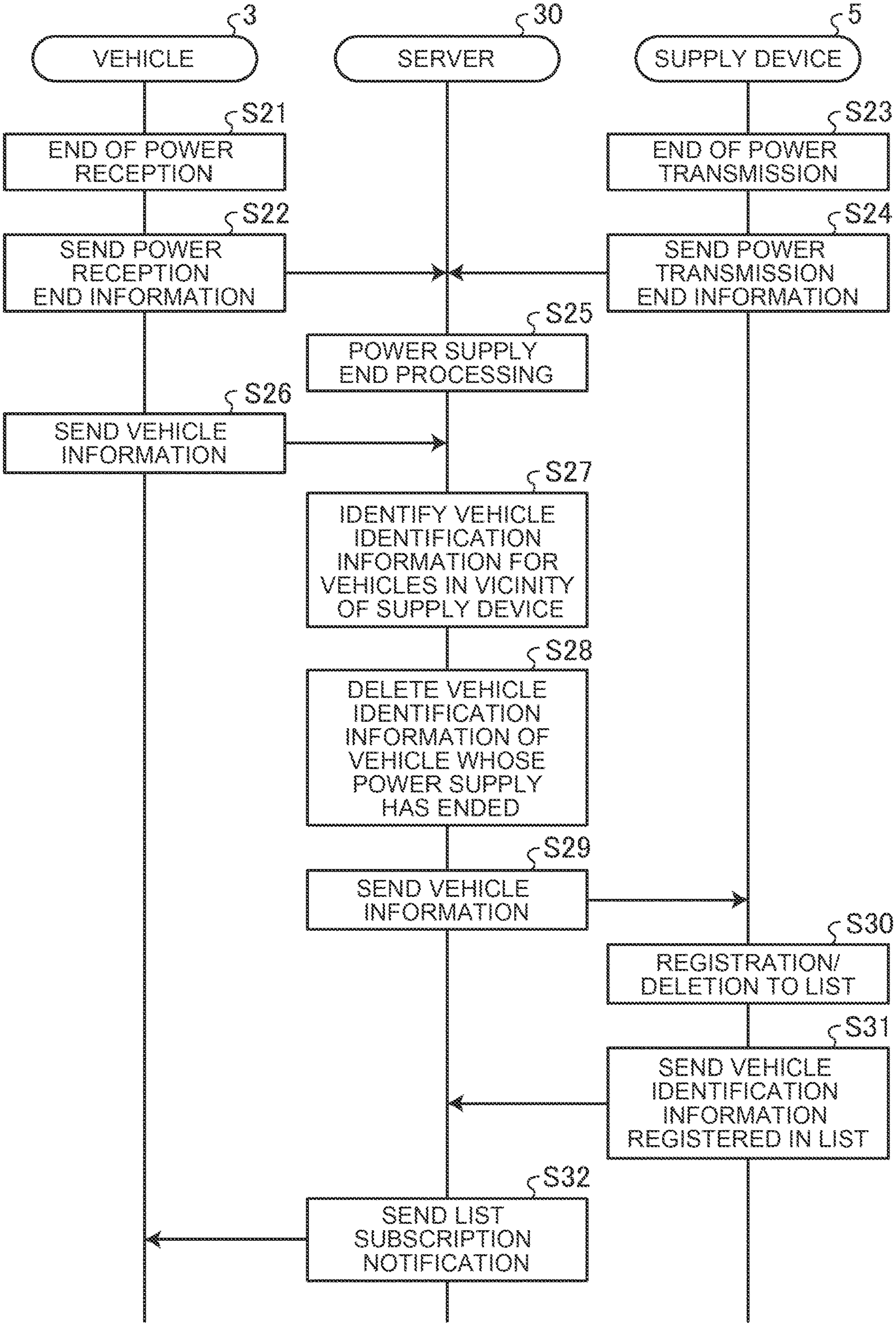
FIG. 8 is a sequence diagram showing the operation after the power supply during traveling from the supply device to the vehicle ends.

The end of power transmission A170 will be described. In this state, the supply device 5 reduces the transmitted electric power to zero and retains or uploads electric power transmission result data such as total transmitted electric power, electric power transmission efficiency, and failure history. Each data is tagged with vehicle identification information. Finally, the supply device 5 deletes the vehicle identification information of the vehicle 3 that has passed through the D-WPT lane. This allows the supply device 5 to be ready for subsequent pairing and electric power transmission to another vehicle. FIG. 8 shows the processing sequence of the end of power transmission A170.

FIG. 8 is a sequence diagram showing the operation after the power supply from the supply device to the vehicle during traveling is completed. When the power reception device 20 of the vehicle 3 finishes receiving power from the supply device 5 (S21), the vehicle 3 transmits power receiving end information to the server 30 (S22). In S22, power reception end information is transmitted from the third communication device 340 of the vehicle 3. The power reception end information includes, as information related to power reception from the supply device 5, vehicle identification information of the vehicle 3, electric power received from the supply device 5, power reception efficiency, and an abnormality detection result, for example.

The supply device 5 ends power transmission to the vehicle 3 when the process of S21 is performed (S23). The processing of S21 and the processing of S23 may or may not be performed at the same time. When the process of S23 is performed, the supply device 5 transmits power transmission end information to the server 30 (S24). In S24, power transmission end information is transmitted from the first communication device 120 of the supply device 5.

When receiving the power reception end information from the vehicle 3 and the power transmission end information from the supply device 5, the server 30 performs power supply end processing for ending power supply from the supply device 5 to the vehicle 3 (S25). In the power supply end process, based on the power reception end information and the power transmission end information, a process of calculating the amount of electric power supplied from the supply device 5 to the vehicle 3 and a process of charging the user of the vehicle 3 based on the calculated amount of electric power supplied are performed.

In addition, the vehicle 3 transmits vehicle information to the server 30 regardless of the power supply termination process (S26). In S26, vehicle information is transmitted from the third communication device 340 of the vehicle 3.

When the server 30 receives the vehicle information from the vehicle 3 after performing the power supply termination process, the server 30 specifies the vehicle identification information of the vehicle 3 located within the vicinity area of each supply device 5 based on the vehicle information (S27).

Then, if a supply device 5 has already completed power feeding to a vehicle 3, the server 30 deletes from the vehicle identification information of the vehicle 3 in the vicinity area of the supply device 5 specified in the process of S27, the vehicle identification information of the vehicle 3 for which the power supply termination process has already been performed (S28).

After that, the server 30 sends the vehicle information associated with the vehicle identification information that has not been deleted in the process of S28 out of the vehicle identification information of the vehicle 3 specified to be located in the vicinity area of each supply device 5 to each supply device 5 (S29).

After the vehicle information is transmitted to each supply device 5 in the process of S29, when the supply device 5 receives the vehicle information from the server 30, the supply device 5 registers/deletes the vehicle identification information in the identification information list (S30). The processing of S30 is the same as the processing of S14 in FIG. 7. After that, the supply device 5 transmits the vehicle identification information registered in the identification information list to the server 30 (S31). The processing of S31 is the same as the processing of S15 in FIG. 7.

When the server 30 receives the vehicle identification information from the supply device 5, the server 30 transmits a list registration notification to the vehicle 3 corresponding to the vehicle identification information registered in the identification information list (S32). The processing of S32 is the same as the processing of S16 in FIG. 7.

As a result, when the processing shown in FIG. 8 is performed, the identification information list indicates that each supply device 5 is located in the vicinity area, that the supply device 5 has not finished supplying power, and that the vehicle identification information is registered for the vehicle 3 for which no vehicle identification information erasure request has been made. Then, when the vehicle identification information of the vehicle 3 is registered in the identification information list of any supply device 5, the vehicle 3 receives the list registration notification. Therefore, the vehicle ECU 330 can determine that the own vehicle is registered in any of the supply devices 5 by receiving the list registration notification. When the vehicle 3 moves out of the vicinity area of the supply device 5, the vehicle identification information of the vehicle 3 is deleted from the identification information list of the supply device 5.

Return to FIG. 6. In addition, at the end of power transmission A170, the power reception device 20 does not need to do anything to make the transmitted electric power zero. The P2PS interface remains active when the vehicle 3 is in the D-WPT lane and the state of the power reception device 20 automatically transitions to pairing for the next electric power transmission from the primary device 13. The state transitions from End Power Transfer A170 to Pairing and Alignment Check A130 as the transition line shown in FIG. 6. As shown in FIG. 6, when a predetermined transition condition is satisfied, it is possible to transition from the Magnetic Coupling Check A140 to the pairing and alignment check A130, and to transition from the Perform Power Transfer A150 to the pairing and alignment check A130. The pairing may be performed individually for the plurality of primary coils 11 or may be performed at a representative point by bundling the plurality of primary coils 11.

In the D-WPT service session A70, when there is no D-WPT request from the vehicle ECU 330, or a series of states from the communication setting and D-WPT service request A60 to the end of power transmission A170 are prohibited. In this case, the process transitions to D-WPT service session end A80, and the wide area wireless communication between the first communication device 120 and the third communication device 340 is stopped. For example, the D-WPT shuts down when the state of charge in battery 320 is too high or when power reception device 20 is too hot for continuous electric power transmission. Such unnecessary D-WPT can be disabled by simply deactivating the P2PS interface. However, by stopping the wide area wireless communication, the power transmission ECU 110 can release the memory occupied for the vehicle 3 without requiring the D-WPT by terminating the established wide area wireless communication.

Also, the D-WPT service session A70 is not limited to transitions such as the transition lines shown in FIG. 6. When the D-WPT service session A70 completes the activities after the pairing and alignment check A130, if the conditions are met for the electric power transmission process to remain in the D-WPT service session A70, do not transition to end the D-WPT service session A80, but transition to compatibility check and service authentication A110. For example, if a predetermined transition condition is met in state of Magnetic Coupling Check A140, the state can transition to Compatibility Check and service authentication A110.

Control Device for Power Supply During Traveling

A control device for power supply during traveling according to an embodiment will be described with reference to the drawings. The control device for power supply during traveling according to the embodiment is specifically realized by the function of the supply device 5 shown in FIG. 2 described above. Further, the control device for power supply during traveling according to the embodiment performs control described below during the D-WPT service session A70 of the electric power transmission process (D-WPT process) shown in FIG. 6. More specifically, the control device for power supply during traveling according to the embodiment performs the control described below after pairing between the power transmission device 10 provided in the power supply lane (D-WPT lane) and the power reception device 20 provided in the vehicle 3 (see A130 in FIG. 6) is completed.

The power transmission ECU 110 of the supply device 5 mainly performs the control performed by the control device for power supply during traveling according to the embodiment. The power transmission ECU 110 is configured to be able to control a foreign object detection device 140 provided in the supply device 5.

As described above, the foreign object detection device 140 is configured to be able to detect a living body (human body, animal, etc.), metallic foreign object, etc. in the vicinity of the power supply lane (for example, above the primary coil 11). Although the foreign object detection device 140 is illustrated in FIG. 2 as one device including a living object protection (LOP) and a foreign object detection (FOD), a biometric detector that exerts the living body protection function and a foreign object detection function. A foreign object detector that exhibits the above may be configured separately.

The "control of the foreign object detection device 140" performed by the power transmission ECU 110 includes, for example, switching the detection range of the biometric detection of the foreign object detection device 140 (enlarging or shrinking), turning on/off the biometric detection operation of the foreign object detection device 140, and the like.

Also, for "switching the detection range of the foreign object detection device 140", the following patterns are conceivable according to the actual configuration of the foreign object detection device 140, for example. (1) When a plurality of primary coils 11 are provided in the power supply lane, and the foreign object detection device 140 is provided for each primary coil 11 (see FIG. 2), some of the foreign object detection devices 140 are turned on and off. Thereby, the detection range of biometric detection is expanded or reduced. (2) When an array of sensor coils constituting the foreign object detection device 140 is provided for one primary coil 11, by turning on and off some of the sensor coils, the detection range of biometric detection is expanded or to shrink.

Specifically, the power transmission ECU 110 acquires predetermined control information from the vehicle 3 that is traveling, and based on this control information, detects a foreign object provided in the power supply lane that transmits electric power to the vehicle that is traveling. Control of device 140 is implemented. The above control information is transmitted from the vehicle 3 to the power transmission ECU 110 using, for example, short range wireless communication (P2PS). In this way, by using short-range wireless communication, the power transmission ECU 110 side can identify the exact position of the vehicle 3.

Examples of the above control information include information about the vehicle speed of the vehicle 3 that is traveling (hereinafter referred to as "vehicle speed information"). In this case, the power transmission ECU 110 identifies the vehicle speed of the vehicle 3 based on the vehicle speed information. Then, when the vehicle speed is high, power transmission ECU 110 reduces the detection range of biometric detection of foreign object detection device 140 compared to when the vehicle speed is low. Alternatively, power transmission ECU 110 operates the biometric detection function of foreign object detection device 140 only when the vehicle speed is low, and does not operate the biometric detection function of foreign object detection device 140 when the vehicle speed is high.

The power transmission ECU 110 determines, for example, whether the vehicle speed of the vehicle 3 is higher than a predetermined threshold. Then, when the vehicle speed is higher than the threshold, power transmission ECU 110 reduces the detection range of the biometric detection of foreign object detection device 140 or turns off the biometric detection operation of foreign object detection device 140. That is, when the vehicle speed of the vehicle 3 is high, there is a low possibility that a person will enter the power supply lane. Therefore, the detection range of the biometric detection of the foreign object detection device 140 is minimized, or the biometric detection function of the foreign object detection device 140 is not operated. The above threshold value can be set to a vehicle speed value that does not allow a person to enter the power supply lane (for example, a vehicle speed that exceeds slow driving). By controlling the foreign object detection device 140 in accordance with the vehicle speed of the vehicle 3 in this manner, electric power consumption can be reduced.

The control information may also include information about the presence or absence of a living body in the vicinity of the power supply lane (hereinafter referred to as "biological information"). This biological information is, for example, information acquired by an ADAS (Automatic Driving Assistance System) provided in the vehicle 3. In this case, power transmission ECU 110 identifies the presence or absence of a living body in the vicinity of the power supply lane based on the biological information. Then, power transmission ECU 110 activates the biometric detection function of foreign object detection device 140 when there is a living body in the vicinity of the power supply lane. In this way, electric power consumption can be reduced by operating the biometric detection function of the foreign object detection device 140 only when there is a living body in the vicinity of the power supply lane.

Further, the power transmission ECU 110 may stop electric power transmission to the vehicle 3 when there is a living body in the vicinity of the power supply lane. This "stopping electric power transmission" includes stopping the electric power being transmitted and not starting the electric power transmission itself. In this way, by stopping (doing not start) the transmission of electric power when there is a living body in the vicinity of the power supply lane, exposure of the human body to magnetism can be suppressed.

Further, both vehicle speed information and biological information may be included as the above control information. In this case, when the vehicle speed of the vehicle 3 is equal to or less than a predetermined threshold value, or when there is a living body in the vicinity of the power supply lane, the power transmission ECU 110 activates the biometric detection function of the foreign object detection device 140 (see S45 in FIG. 9 to be described later). On the other hand, when the vehicle speed of the vehicle 3 is higher than the predetermined threshold value and there is no living body in the vicinity of the power supply lane, the power transmission ECU 110 does not operate the biometric detection function of the foreign object detection device 140 (see S46 in the figure). In this manner, electric power consumption can be reduced by not operating the biometric detection function of the foreign object detection device 140 when the vehicle 3 is traveling at a high vehicle speed and there is no living body in the vicinity of the power supply lane.

Further, the control information may include information regarding the detection range of the foreign object detection device 140 or information regarding whether or not the biometric detection function of the foreign object detection device 140 should be operated. In this case, power transmission ECU 110 acquires the above information from vehicle 3 via server 30. Then, power transmission ECU 110 controls foreign object detection device 140 based on the above information. That is, in this aspect, the vehicle 3 side determines the detection range of the biometric detection of the foreign object detection device 140 and whether to operate the biometric detection function of the foreign object detection device 140, and the vehicle 3 side controls the foreign object detection device 140. (See FIG. 10 below). In this way, by controlling the foreign object detection device 140 on the vehicle 3 side, the processing load can be distributed.

A first control executed by the control device for power supply during traveling according to the embodiment will be described with reference to FIG. 9. The figure shows a case where vehicle speed information and biological information are acquired as control information from the vehicle 3 side, and the biometric detection function of the foreign object detection device 140 is controlled by the supply device 5 side. In addition, in FIG. 9, the biometric detection function of the foreign object detection device 140 is expressed as "biometric detector".

First, the power transmission ECU 110 determines whether the pairing between the power transmission device 10 and the power reception device 20 (see A130 in FIG. 6) has been completed (S41). When it is determined in S41 that the pairing is completed (Yes in S41), the power transmission ECU 110 acquires control information from the vehicle 3 (S42).

Subsequently, the power transmission ECU 110 determines whether the vehicle speed of the vehicle 3 is higher than a predetermined threshold (S43). When it is determined in S43 that the vehicle speed of the vehicle 3 is higher than the threshold (Yes in S43), the power transmission ECU 110 determines whether the vehicle 3 has detected a living body by ADAS (S44). In S44, if the control information acquired from the vehicle 3 contains biological information, a positive determination is made, and if not, a negative determination is made.

When it is determined in S44 that the vehicle 3 has detected a living body by ADAS (Yes in S44), the power transmission ECU 110 operates the biometric detector (S45), and completes this process. On the other hand, when it is determined in S44 that the vehicle 3 has not detected a living body by ADAS (No in S44), the power transmission ECU 110 does not operate the biometric detector (S46), and completes this process.

If it is determined in S41 that the pairing has not been completed (No in S41), the power transmission ECU 110 proceeds to S46. Further, when it is determined in S43 that the vehicle speed of the vehicle 3 is equal to or less than the threshold (No in S43), the power transmission ECU 110 proceeds to S45.

A second control executed by the control device for power supply during traveling according to the embodiment will be described with reference to FIG. 10. The figure shows a case where the vehicle 3 determines the detection range of the biometric detector and whether or not the biometric detector needs to operate.

First, the vehicle 3 detects a living body by ADAS (S51). Subsequently, the vehicle 3 determines whether or not the biometric detector needs to be operated, for example, based on the vehicle speed of the own vehicle (S52). Subsequently, the vehicle 3 transmits to the server 30 whether or not the biometric detector needs to operate and the position information of the vehicle 3 (hereinafter referred to as "vehicle position information") (S53).

Subsequently, the server 30 identifies an area where the living body should be detected based on whether or not the biometric detector needs to operate and the vehicle position information (S54). Subsequently, the server 30 transmits control information (necessity of operation of the biometric detector) for the biometric detector in the specified area to the supply device 5 that controls the biometric detector (S55). Subsequently, the power transmission ECU 110 of the supply device 5 that has received the control information operates the corresponding biometric detector (S56), and completes this process.

According to the control device for power supply during traveling according to the embodiment described above, it is possible to appropriately perform biometric detection while suppressing electric power consumption.

Further advantages and modifications can be easily derived by those skilled in the art. Therefore, the broader aspects of the disclosure are not limited to the specific details and representative embodiments shown and described above. Accordingly, various changes may be made without departing from the spirit or scope of the general inventive concept defined by the appended claims and equivalents thereof.

Figure 9:
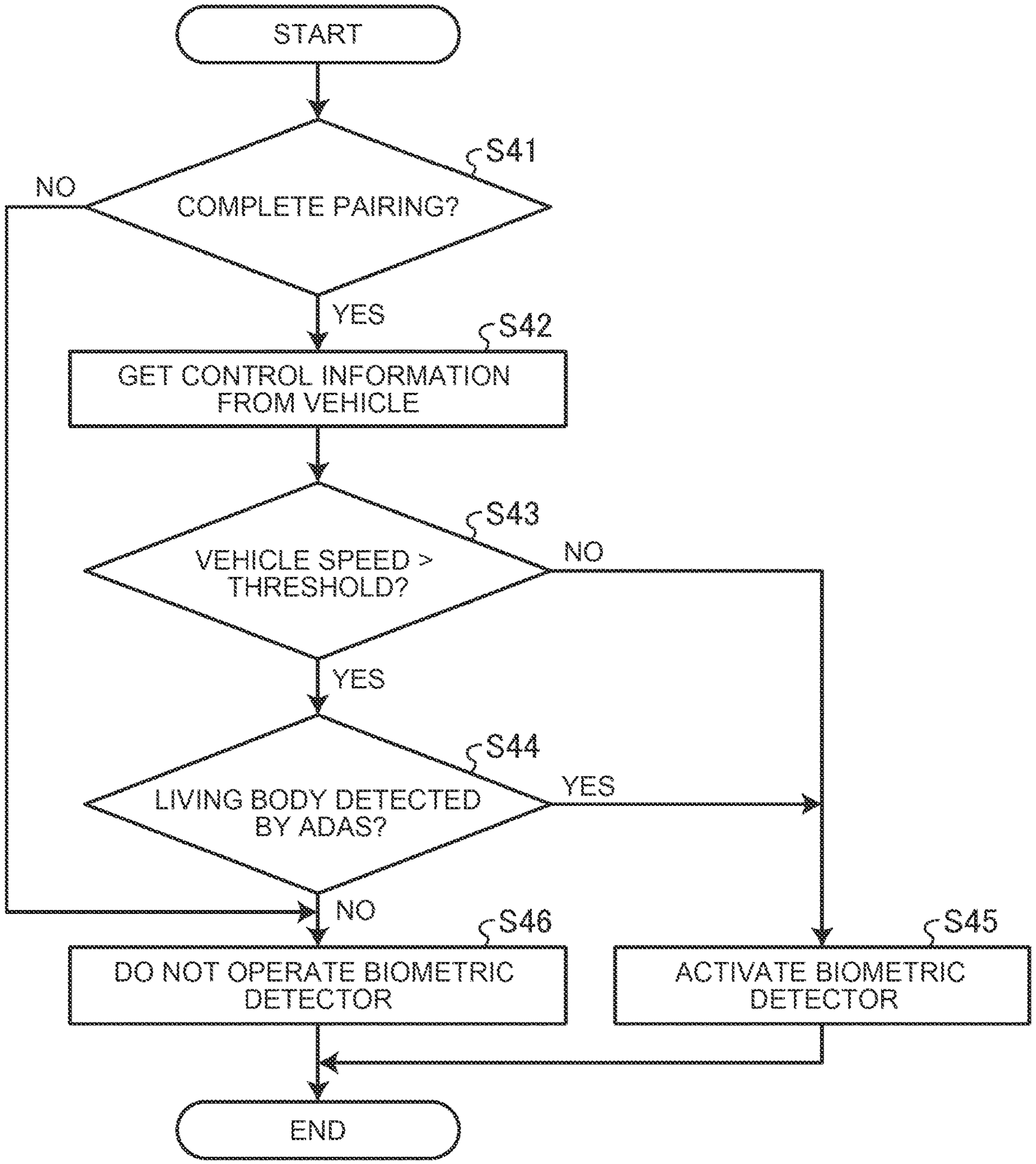
FIG. 9 is a flowchart showing the flow of first control processing executed by the control device for power supply during traveling according to the embodiment.
Figure 10:
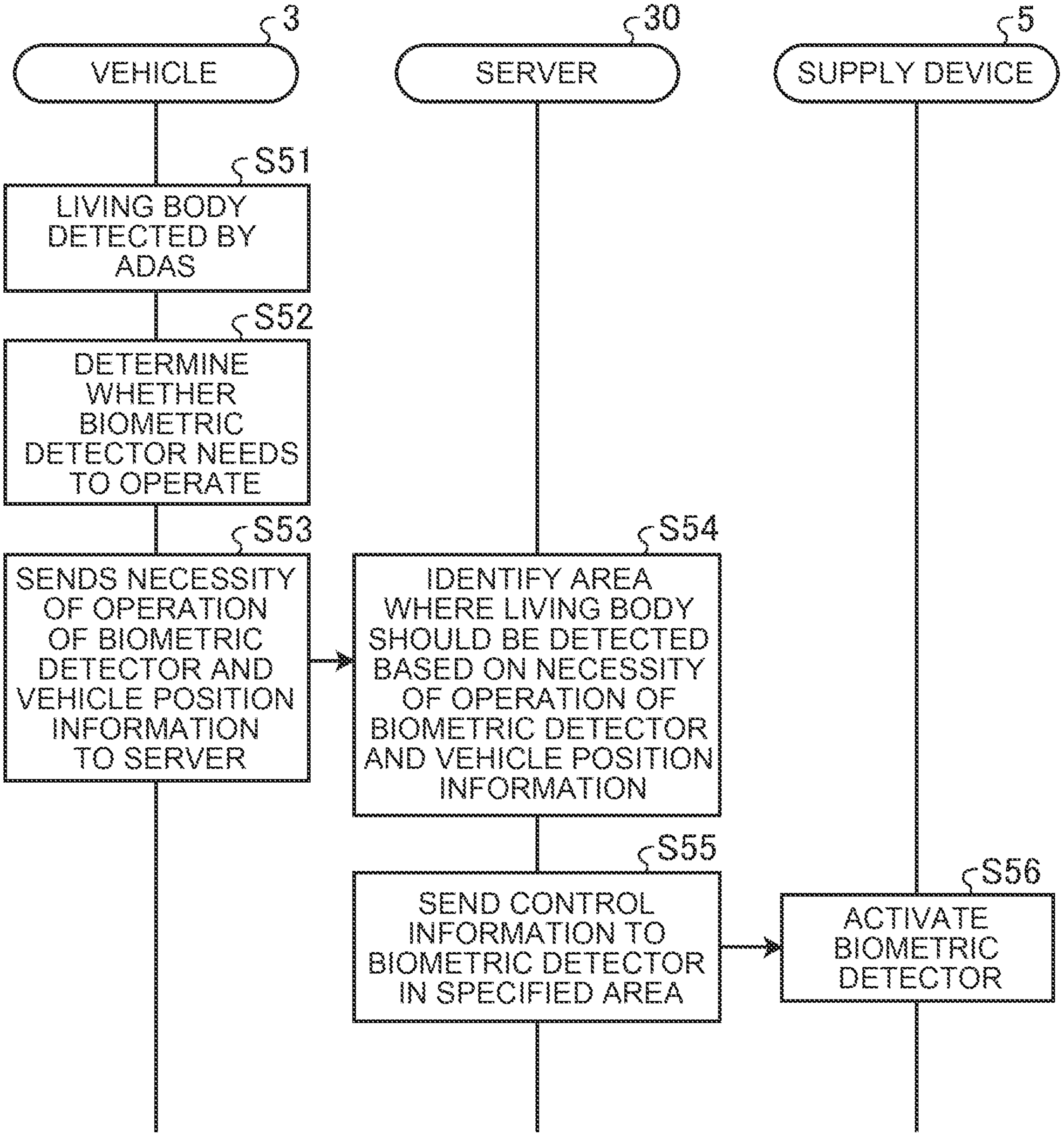
FIG. 10 is a flowchart showing the flow of second control processing executed by the control device for power supply during traveling according to the embodiment.

For example, in FIGS. 9 and 10, an example of controlling the biometric detection function of foreign object detection device 140 has been described, but the metal foreign object detection function (metallic foreign object detector) of foreign object detection device 140 may be controlled. In this case, while the vehicle 3 is traveling, regardless of the vehicle speed, the metallic foreign object detector is not operated. Also, when the traveling vehicle 3 stops and immediately starts moving, the metallic foreign object detector is not operated. On the other hand, if the stationary state continues after the traveling vehicle 3 has stopped, the metallic foreign object detector is operated. As a result, it is possible to appropriately perform foreign object detection while suppressing electric power consumption.

What is claimed is:

1. A control device for power supply during traveling, the control device comprising a processor configured to:
- acquire control information from a vehicle; and
- perform, based on the control information, control of a biometric detector provided in a power supply lane that transmits electric power to the vehicle that is traveling, wherein:
- the control information is presence or absence of a living body in vicinity of the power supply lane; and
- the processor operates the biometric detector when there is a living body in the vicinity of the power supply lane.

2. A control device for power supply during traveling, the control device comprising a processor configured to:
- acquire control information from a vehicle; and
- perform, based on the control information, control of a biometric detector provided in a power supply lane that transmits electric power to the vehicle that is traveling, wherein:
- the control information is presence or absence of a living body in vicinity of the power supply lane; and
- the processor stops electric power transmission to the vehicle when there is a living body in the vicinity of the power supply lane.

3. A control device for power supply during traveling, the control device comprising a processor configured to:
- acquire control information from a vehicle; and
- perform, based on the control information, control of a biometric detector provided in a power supply lane that transmits electric power to the vehicle that is traveling, wherein
- the processor performs control of the biometric detector after pairing between a power transmission device provided in the power supply lane and a power reception device provided in the vehicle is completed.

* * * * *